No. 742,368. PATENTED OCT. 27, 1903.
M. M. SUPPES.
ROLL ADJUSTING MECHANISM FOR ROLLING MILLS.
APPLICATION FILED MAY 23, 1903.
NO MODEL.

WITNESSES:
INVENTOR
M. M. Suppes,
by Geo. H. Parmelee,
his ATTORNEY.

No. 742,368. Patented October 27, 1903.

UNITED STATES PATENT OFFICE.

MAXIMILIAN M. SUPPES, OF ELYRIA, OHIO.

ROLL-ADJUSTING MECHANISM FOR ROLLING-MILLS.

SPECIFICATION forming part of Letters Patent No. 742,368, dated October 27, 1903.

Application filed May 23, 1903. Serial No. 158,485. (No model.)

*To all whom it may concern:*

Be it known that I, MAXIMILIAN M. SUPPES, of Elyria, in the county of Lorain and State of Ohio, have invented a new and useful Improvement in Roll-Adjusting Mechanism for Rolling-Mills, of which the following is a full, clear, and exact description, reference being had to the accompanying drawings, which form a part of this specification.

My invention has relation to roll-adjusting mechanism for rolling-mills, and is applicable to universal mills and all other rolling-mills having a screw-down adjustment of the upper roll.

The object of my invention is to improve the bearing for the roll-adjusting screw, whereby weak points are eliminated without increasing the weight of or weakening the housings and whereby strains and false bearings are avoided; and to this end my invention consists in a housing-nut of the improved construction hereinafter described and claimed.

My invention also consists in the novel construction, arrangement, and combinations of parts, all substantially as hereinafter described, and pointed out in the appended claims, reference being had to the accompanying drawings, in which—

Figure 1:
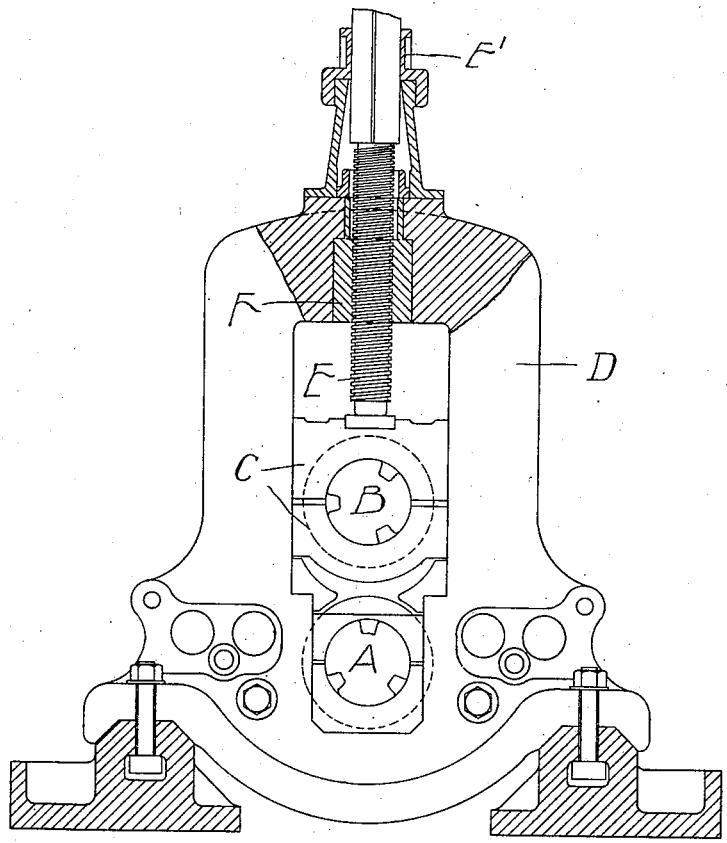
Figure 2:
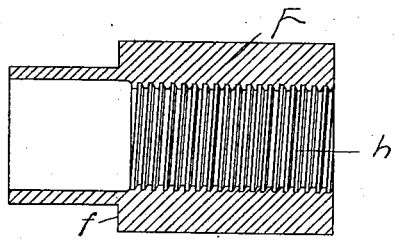

Figure 1 is a view, partly in end elevation and partly in vertical section, of a rolling-mill embodying my invention; and Fig. 2 is a detail sectional view of the housing-nut.

The letter A designates the lower roll, B the upper roll, journaled in vertically-movable boxes or carriages, one of which is shown at C, and D is one of the housings.

E designates the screw, actuated through a pinion E' thereon or by any other usual or suitable means.

F designates a housing-nut which forms a bearing for the said screw. This nut is secured in a recess in the upper portion of the housing D and is formed with a single broad horizontal shoulder *f*, which seats against a corresponding shoulder in the housing for the purpose of resisting the severe upward thrust or pressure imparted to the screw from the roll B through the box or carriage C. It has been customary heretofore to extend the bearing for the screw entirely through the housing-nut, which has usually been formed with a number of steps or shoulders, and in order to prevent, on the one hand, undue weakening of the housing or, on the other hand, undue increase in the size and weight of the housing the walls of the upper portions of the nut have necessarily been made thin. As will be readily seen, the point where this thin portion joins the shoulder at its base has been a point of weakness, the result of which is to cause the nut to spring, thereby throwing a strain upon it and upon the screw and causing the latter to take false bearings in the nut, with consequent binding and wear. In the present construction it will be noted that the thread *h*, with the nut F, is stopped at a point somewhat below the shoulder *f* and that above this point the screw has a free clearance in the nut. This gives the screw a firm true bearing and eliminates the objections above described without in any way weakening the housing or increasing its size or weight. I prefer that the nut shall, as shown, have but a single broad step or shoulder, so that the full thickness of its wall may be preserved to a point somewhat beyond the point where its interior thread terminates.

While I have shown but one end of the mill, it will be understood that the other end is provided with a similar construction and arrangement of the adjusting devices, the two screws being worked in unison through a single actuating mechanism in accordance with the usual practice.

It will be readily seen that the thrust and pressure transmitted to the housings through the screws and housing-nuts are very heavy and that to resist this thrust and pressure the full strength of the top or connecting portion of the housing must be preserved. There is also a practical limit beyond which it is not desirable to go if it can be avoided in increasing the size and weight of the housings. It is for these reasons that the diameter of the housing-nuts must be kept as small as possible. The present invention permits this to be done with perfect safety.

Having thus described my invention, what I claim as new, and desire to secure by Letters Patent, is—

1. In a rolling-mill, the combination with a housing in which the movable rolls are journaled, of a housing-nut seated therein and formed with a broad horizontal shoulder terminating in an upper portion or neck and having an upward bearing in said housing, said nut having an interior thread which terminates at a point below the said shoulder.

2. In a rolling-mill, a housing-nut having an upper portion or neck and a single broad exterior shoulder bearing upwardly against a seat in the roll-housing, and having its interior thread terminating at a point below said shoulder, in combination with a screw engaging said thread and having a free clearance in the nut above the thread.

In testimony whereof I have affixed my signature in presence of two witnesses.

MAXIMILIAN M. SUPPES.

Witnesses:
F. W. WATERMAN,
D. W. LAWRENCE.